FIG. 2
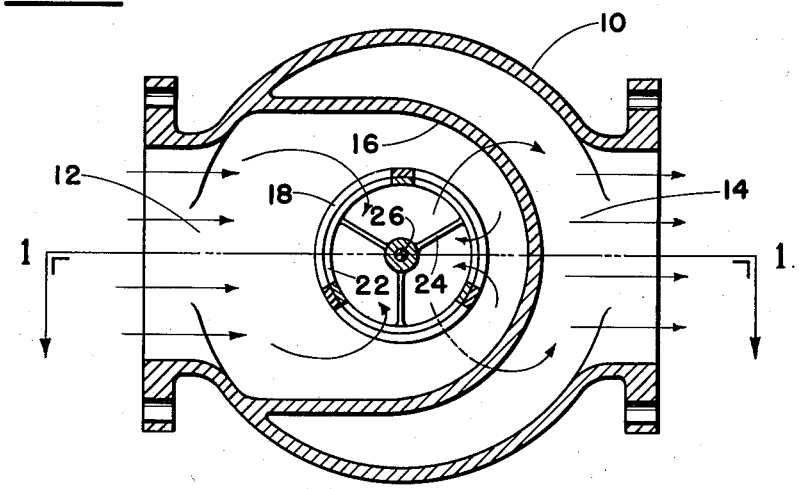
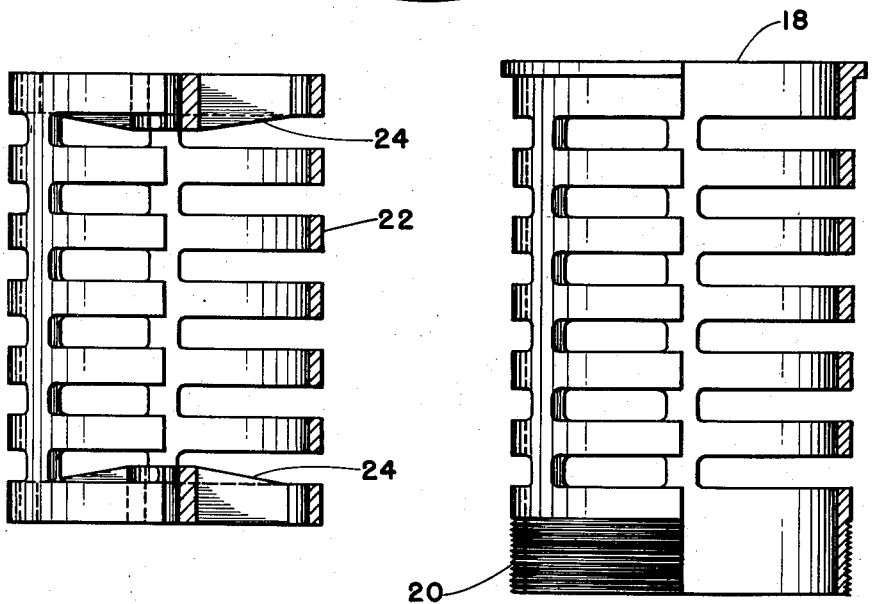
FIG. 3
Inventor
ARTHUR F. ARNOLD

Patented Nov. 6, 1951

2,573,680

UNITED STATES PATENT OFFICE 2,573,680

SLEEVE TYPE RELIEF VALVE

Arthur F. Arnold, United States Coast Guard

Application December 13, 1945, Serial No. 634,872

2 Claims. (Cl. 137—53)

(Granted under the act of March 3, 1883, as amended April 30, 1928; 370 O. G. 757)

This invention relates to a diaphragm operated back-pressure valve; and in particular to a diaphragm operated valve of the concentric sleeve type which is adapted to maintain a uniform back pressure on the exhaust of steam engines or other fluid systems and whose operation is independent of any fluctuation in pressure on the exhaust side of the valve.

Diaphragm operated valves for the maintenance of uniform back pressure on steam lines are known; but when they are of the concentric sleeve type, the movable sleeve generally is provided with a closed head or end which seriously affects the operation of the valve when there is a fluctuation in the suction or pressure on the exhaust side of the valve. They generally have springs which are set to maintain a uniform pressure. These springs are often located within the body of the valve and are subject to the heat action of the steam and soon become erratic in their operation. The valve of this invention is characterized by the fact that both the fixed and movable sleeves are open ended and the pressure regulating spring is remote or outside of the valve body and is not affected by the heat of the steam. The fact that the sleeves are open ended makes the valve immune to the fluctuations in pressure on the exhaust side thereof.

With the defects of the present art valves in mind it is, therefore, an object of this invention to provide a valve which will maintain a uniform pressure on the exhaust of steam engines or other fluid systems.

It is also an object of this invention to provide a valve which is not affected by the fluctuations in pressure from the exhaust side of the valve.

It is a further object of this invention to provide a valve of sturdy construction, which is economical in manufacture, and efficient in operation.

These and other objects will be apparent in the following specification, claims and in the accompanying drawings which show a preferred embodiment of the invention and in which:

Figure 2 is a horizontal section on the median line of the valve body taken on section line 2—2 looking in the direction indicated by the arrows.

Figure 3 is a detail of the sleeves and is partly in section and partly in elevation.

Figure 1:
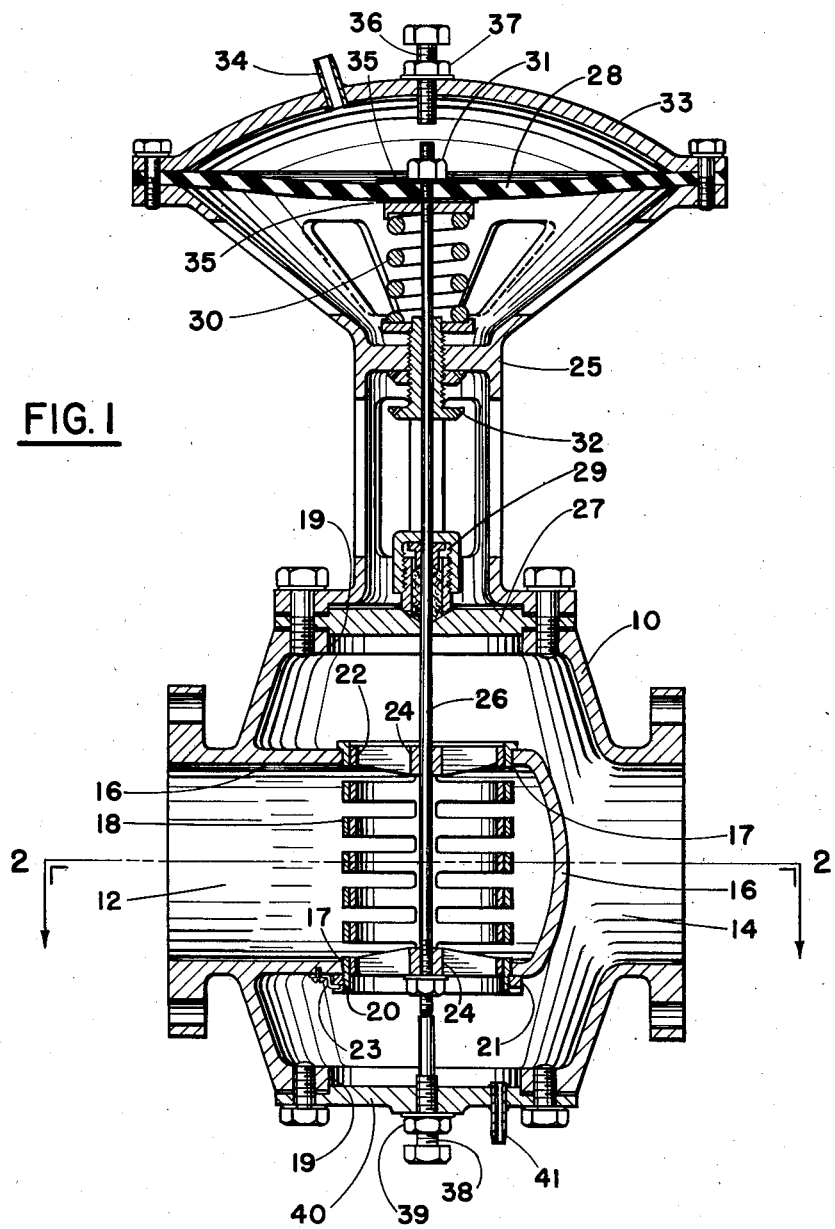
Figure 1 is a longitudinal vertical section taken on section line 1—1 of Fig. 2.

Referring now to Figure 1, 10 represents the body of a standard valve which is provided with inlet port 12 and discharge port 14. Body 10 is provided with an internal partition-wall in the form of a cup providing a chamber 16 which is concentric with inlet port 12 and extends about three-quarters of the way across the valve body. Chamber 16 is provided with aligned openings 17 in its top and bottom portions. Mounted in openings 17 is a sleeve 18 which is provided with a flange on its upper end which is adapted to rest on the top of the wall of chamber 16. On its lower end sleeve 18 is provided with threads for engagement with annular ring 22 which is held by clips 23 which in turn are screwed to the lower wall of chamber 16. In slidable relationship to sleeve 18 is a sleeve 22. Both sleeves 18 and 22 are provided with slotted ports which by the movement of sleeve 22 with respect to sleeve 18 may be brought into matched relationship. Sleeve 22 is mounted on rod 26 by means of spiders 24. Shaft 26 extends through top plate 21 on flange 29, through steel frame 25 and is connected at its upper end to diaphragm 28 by threaded engagements with nut 31 which bears on upper diaphragm plate 35. The movement of rod 26 is controlled by means of coil spring 30 which is set for the desired pressure by means of threaded bushing 32. Diaphragm 28 is held rigidly between the flange of steel frame 25 and that of cast steel dome 33. Steam is admitted to the upper side of diaphragm 28 through nipple 34 which is connected to the exhaust line from a steam engine. The movement of rod 26 and sleeve 22 is limited by means of set screw 36 at its upper end and 38 at its lower end. These screws are locked in set positions by means of lock-nuts 37 and 39 on the upper and lower screws in conjunction with cast steel dome 33 and bottom plate 40, respectively. Bottom plate 40 is provided with drain outlet 41. Steel frame 25 is provided with hand holds for adjustment both of the pressure regulating spring and the packing gland 29.

Figure 2 illustrates the horizontal arrangement of the sleeves within chamber 16 and the flow of the steam therethrough from the inlet port 12 through discharge port 14.

Figure 3 shows the arrangement of the ports in the fixed sleeve and in that of the sliding sleeve 22; also the construction of these sleeves is illustrated. It is clear that each sleeve comprises a cylindrical member having a plurality of axially displaced zones, each zone comprising a plurality of circumferentially displaced arcuate slots. In the particular embodiment indicated in Fig. 2, three slots are provided in each zone separated by wall-partitions of the cylindrical member, so that each slot subtends slightly less than a 120° arc.

In operation, steam from the exhaust line of a steam engine or other prime mover is admitted under the steel dome 33 through nipple 34. As the pressure builds up in the chamber between the upper side of diaphragm 28 and steel dome 33 to that set by spring 30, diaphragm 28 is gradually depressed and rod 26 is depressed thereby. The ports in the fixed and movable sleeve uncover each other and gradually at maximum pressure are fully opened. Because of the large area of these ports and the small movement of the slides relative to each other, the steam from the exhaust of the steam engine passes rapidly from inlet port 12 through the ports in each sleeve and thence to the condenser. It is readily apparent that fluctuation of pressure in the condenser, that is, fluctuation in the vacuum created by the condenser will have no effect on the operation of the sleeves with respect to each other.

While the description herein has been drawn to a pressure regulated valve for the exhaust line of a steam engine, it is not desired to be strictly limited thereto as this type of valve is applicable to other systems wherein a fixed pressure is desired to be maintained. For instance, the valve could be used in refrigerating systems for maintaining a uniform pressure on the refrigerating element. Furthermore, other constructions and arrangements of parts could be used without departing from the spirit or scope of the invention. Such other applications and constructions and arrangements are included within the scope of the invention to the extent as defined by the herewith appended claims.

The invention herein described may be manufactured and used by or for the Government of the United States for governmental purposes without the payment to me of any royalty thereon or therefor.

I claim:

1. A back pressure diaphragm operated valve for instantly equating the steam from the exhaust line to the pressure on the outlet side and provided with a diaphragm and a body having inlet and outlet ports, said body including an internal cup-like wall providing a chamber therein, said chamber having aligned openings, a first open-ended sleeve passing through said chamber, means fixing said first sleeve to said chamber, a second open-ended sleeve inside and slidably contacting said first sleeve, each of said sleeves comprising a cylindrical member having a plurality of axially displaced zones, each zone comprising a plurality of wall partitions dividing said zone into a plurality of circumferentially displaced slots, said second sleeve comprising a spider at each end, and a rod attached to one of said spiders and extending to the diaphragm, said rod supporting said second sleeve movable with respect to said first sleeve, the second sleeve adapted to move with respect to said first sleeve in response to pressure on the diaphragm independently of fluctuation in pressure on the outlet side of the valve.

2. A diaphragm operated back-pressure regulating valve of a type described comprising a valve body provided with inlet and outlet ports, a bottom plate, a top plate, and a chamber inside said body in line with said inlet port and open thereto, said chamber extending toward said outlet port but terminating short thereof, said chamber having a pair of aligned openings in the top and bottom thereof, a first open-ended sleeve comprising a cylindrical wall provided with lateral slots, said sleeve having a flange and threads on opposite ends thereof, said sleeve passing through said openings with said flange carried by said chamber, means engaging said threads for firmly securing said first sleeve to said chamber, a second open-ended sleeve comprising a cylindrical wall with lateral slots, each of said sleeves comprising a cylindrical member having a plurality of axially displaced zones, each zone comprising a plurality of wall partitions dividing said zone into a plurality of circumferentially displaced slots, said second sleeve having spider means at the ends thereof, said second sleeve slidably fitting inside said first sleeve in close contact with the interior surface thereof, a steel frame mounted on said top plate, a dome member provided with an inlet for a gaseous fluid, a diaphgram, said dome member and said frame being secured together with said diaphragm therebetween, said diaphragm and dome forming a pressure chamber responsive to the pressure of said fluid, a rod secured to said spider means and extending from said spider means to said diaphragm and secured thereto, said rod passing through an opening in said top plate, a packing gland on the outside of said top-plate and around said rod for sealing the last said opening, and a coiled pressure-regulating spring outside of said gland spaced therefrom, said spring pressing said diaphragm outward, and means for adjusting said spring to fix the pressure on said diaphragm.

ARTHUR F. ARNOLD.

REFERENCES CITED

The following references are of record in the file of this patent:

UNITED STATES PATENTS

| Number | Name | Date |
|---|---|---|
| 353,081 | Patterson | Nov. 23, 1886 |
| 559,881 | Ahrens | May 12, 1896 |
| 754,467 | Lombard | Mar. 15, 1904 |
| 1,286,397 | Olsen | Dec. 3, 1918 |
| 1,612,567 | Browne | Dec. 28, 1926 |
| 1,729,819 | Campbell | Oct. 1, 1929 |
| 1,938,943 | Terry | Dec. 12, 1933 |
| 1,944,486 | Bailey | Jan. 23, 1934 |
| 2,371,428 | De Giers | Mar. 13, 1945 |